United States Patent
Reinsch

[11] 3,950,084
[45] Apr. 13, 1976

[54] CINEMATOGRAPHIC APPARATUS WITH ADJUSTABLE SHUTTER MEANS

[75] Inventor: Herbert Reinsch, Kongen, Germany

[73] Assignee: Robert Bosch Photokino G.m.b.H., Stuttgart, Germany

[22] Filed: Feb. 15, 1972

[21] Appl. No.: 226,435

[30] Foreign Application Priority Data
Feb. 24, 1971 Germany............................ 2108668

[52] U.S. Cl. ................ 352/169; 352/121; 352/137; 352/177
[51] Int. Cl.².......................................... G03B 21/38
[58] Field of Search ............ 352/137, 169, 177, 121

[56] References Cited
UNITED STATES PATENTS

| | | | |
|---|---|---|---|
| 2,462,302 | 2/1949 | Bolsey.................................. | 352/169 |
| 3,397,937 | 8/1968 | Schrader.............................. | 352/169 |
| 3,520,598 | 7/1970 | Murata ........................:....... | 352/137 X |
| 3,601,481 | 8/1971 | Kessler................................. | 352/169 |
| 3,603,678 | 9/1971 | Anderl................................. | 352/177 |

*Primary Examiner*—Monroe H. Hayes
*Attorney, Agent, or Firm*—Michael J. Striker

[57] ABSTRACT

A motion picture camera wherein a rotary shutter can be arrested in a first or a second angular position in which its blade respectively overlies and is out of register with the light-admitting aperture. In order to terminate a long exposure which is started with stoppage of the shutter in the second angular position, the user must close an auxiliary switch serving to energize an electromagnet which starts an electric motor for the shutter and simultaneously withdraws a tooth of a pivotable intercepting lever from the path of movement of two projections on the shutter. The first projection approaches and engages the tooth when the shutter is to be arrested in the first position, and the second projection approaches and engages the tooth in the second position of the shutter. The control system which times the entry of the tooth into the path of the oncoming first or second projection comprises a contact plate which rotates with the shutter and is tracked by two elastic contacts a selected one of which can be connected in the circuit of the electromagnet by a two-way switch. The contact plate carries two angularly and radially offset insulators. When one of the insulators engage one of the elastic contacts which one contact is then connected in the circuit of the electromagnet, the electromagnet is deenergized and allows a spring to move the tooth into the path of the oncoming first projection on the shutter. When the other insulator engages the other elastic contact (which other contact is then connected in the circuit of the electromagnet), the electromagnet is deenergized and allows the spring to move the tooth into the path of the second projection on the shutter.

16 Claims, 1 Drawing Figure

U.S. Patent April 13, 1976 3,950,084
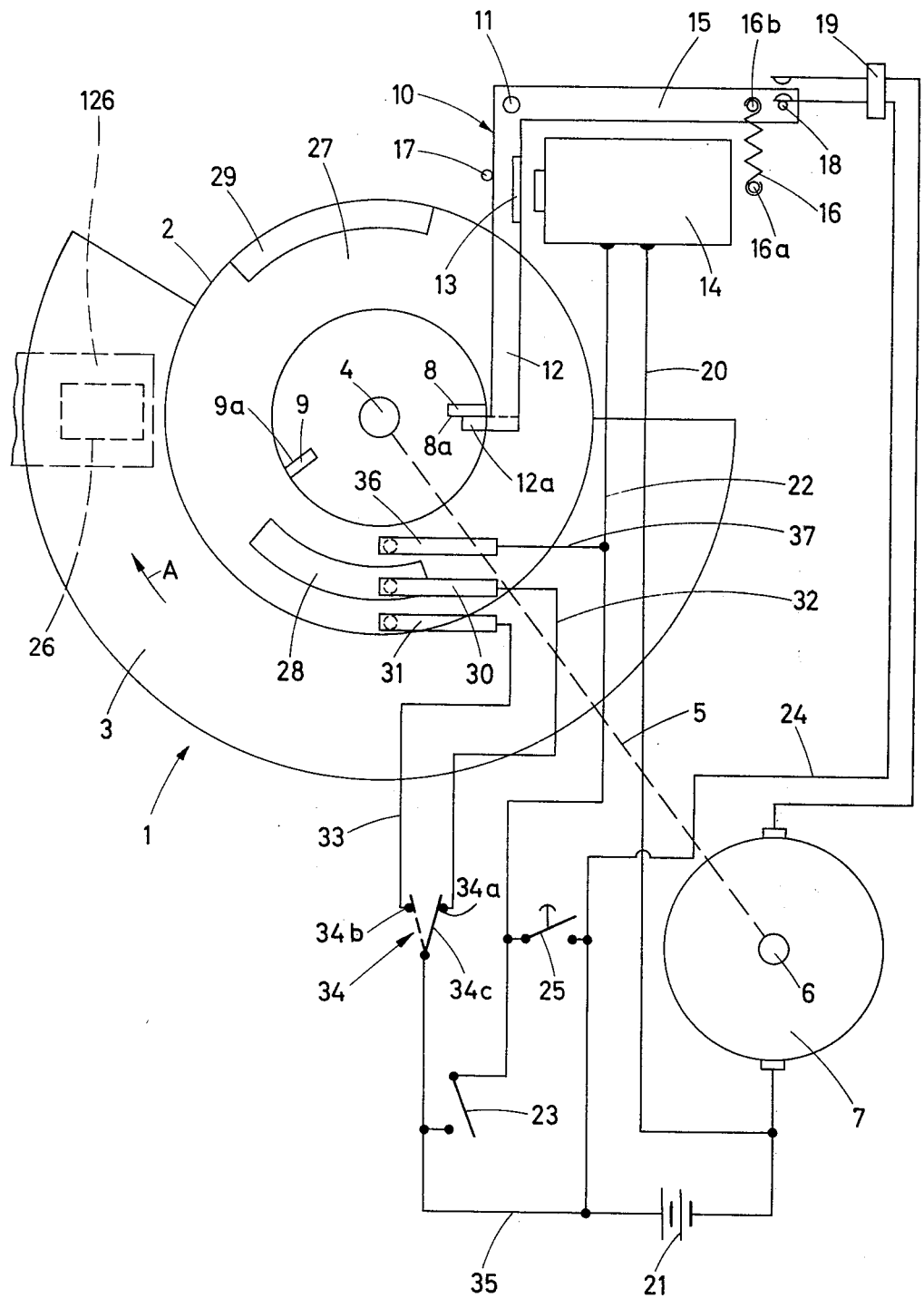

CINEMATOGRAPHIC APPARATUS WITH ADJUSTABLE SHUTTER MEANS

BACKGROUND OF THE INVENTION

The present invention relates to cinematographic apparatus in general, and more particularly to improvements in adjustable shutters which can be utilized in motion picture cameras for the making of exposures with short exposure times whose duration is determined in advance by appropriate setting of the apparatus, and exposures with longer exposure times as selected by the user from exposure to exposure subsequent to start of the respective exposure. Still more particularly, the invention relates to improvements in motion picture cameras wherein a rotary shutter can be arrested in two different angular positions in one of which it overlies and in another of which it exposes the aperture for admission of scene light to unexposed film frames.

German printed publication No. 2,002,699 discloses a motion picture camera wherein a rotary shutter can be arrested in two different angular positions. If the shutter is arrested in that angular position in which its blade overlies the light-admitting aperture, the duration of the exposure time corresponds to that interval which is required to rotate the shutter through a predetermined fraction of a single revolution. If, on the other hand, the shutter is arrested in that angular position in which the shutter blade is out of register with the light-admitting aperture, the film frame behind such aperture remains exposed to scene light for as long as the shutter stays idle, i.e., at the will of the operator who must depress a knob or otherwise manipulate a device serving to set the shutter in motion in order to allow the blade to again overlie the aperture and to thus terminate the exposure of that film frame which is in register with the aperture. Such exposures with "long" exposure times are often necessary for the taking of pictures in twilight or at night with artificial illumination of a subject or scene. The arresting or intercepting mechanism of the camera which is disclosed in the German printed publication employs a pivotable intercepting lever which cooperates with two cams on the shaft of the rotary shutter. The cams are angularly and axially offset relative to each other. When the lever is caused to engage one of the cams, the shutter is arrested in an angular position in which the blade overlies the light-admitting aperture. When it cooperates with the other cam, the lever arrests the shutter in that angular position in which the blade is out of register with the aperture. The lever is mounted on a sleeve which is reciprocable in parallelism with the axis of the shutter by means of a handle or knob which must be manipulated by the user of the camera.

French Pat. No. 985,406 discloses a motion picture camera wherein the arresting or intercepting mechanism for the rotary shutter comprises two discrete levers one of which must be actuated to arrest the shutter in a position in which the blade overlies the light-admitting aperture and at least the other of which must be actuated to arrest the shutter in that angular position in which the blade is out of register with the aperture. When the user wishes to make exposures with long exposure times, a knob must be depressed to effect simultaneous actuation of both levers.

German Utility Model No. 1,503,407 discloses an arresting or intercepting mechanism which employs a substantially L-shaped pivotable member mounted on a leaf spring and having several stop surfaces. One leg of the L-shaped member is biased by a spring against a knob which is depressible in the longitudinal direction of the one leg. Depending on the setting of the camera (for the making of exposures with relatively short or with relatively long exposure times), a depression of the knob results in larger or smaller displacement of the L-shaped member whereby the member first releases the shaft of the shutter and thereupon engages and arrests such shaft in the desired angular position.

A drawback of the just described conventional intercepting mechanisms is that they are rather bulky, complex and employ a substantial number of parts. Furthermore, the user of the camera must adjust the intercepting mechanism whenever he wishes to switch from the taking of pictures with long exposure times to the taking of pictures with short exposure times, or vice versa. Thus, the sleeve for the single intercepting lever of the camera which is disclosed in the aforementioned German printed publication must be shifted by hand so as to move the lever into register with the selected cam on the shaft of the shutter. In the cameras of the French patent and the German Utility Model, the knob must be shifted with reference to the intercepting member or members. Also, the cameras must be provided with detect means to prevent inadvertent changes in the position of the knob.

SUMMARY OF THE INVENTION

An object of the invention is to provide a cinematographic apparatus particularly a motion picture camera wherein a shutter can be arrested in two different positions in which its blade means respectively overlies and is out of register with the light-admitting aperture, with novel and improved means for arresting or intercepting the shutter in the desired angular position.

Another object of the invention is to provide a motion picture camera wherein such intercepting or arresting means comprises a minimal number of parts and occupies little room in the body of the camera.

A further object of the invention is to provide in a motion picture camera highly reliable, simple and rugged means for intercepting the shutter in a desired one of two different positions which are respectively needed for the making of exposures with relatively short and with relatively long exposure times, e.g., a small fraction of a second and one or more seconds.

An additional object of the invention is to provide a motion picture camera wherein the manner of manipulating the intercepting means for a shutter is sufficiently simple to enable a beginner or an unskilled amateur photographer to take satisfactory pictures with short or long exposure times, to rapidly shift from the taking of pictures with short exposure times to the taking of pictures with long exposure times or vice versa, or to make single exposures with selected exposure times.

The invention resides in the provision of a cinematographic apparatus, particularly a motion picture camera for the making of single exposures, for the making of a desired number of successive exposures with predetermined short exposure times, and for making of long exposure times which are terminated at the will of the user, preferably in such a way that a fresh long exposure is started in automatic response to completion of the preceding long exposure. The apparatus comprises a shutter having blade means and being movable between and beyond first and second positions in which the blade means respectively overlies and is out of register with a light-admitting aperture located in front of the foremost unexposed film frame, offset first and second surfaces arranged to move about a predetermined path when the shutter is in motion, drive means which preferably includes an electric motor and means for transmitting torque from the motor to the shutter, an intercepting device which can assume the form of a twoarmed lever and is movable in a predetermined plane (preferably in a plane which is normal to the optical axis) between operative and inoperative positions in which a tooth or an analogous portion of the intercepting device respectively extends into and is retracted from the path of movement of the surfaces whereby the shutter is respectively arrested in its first and second angular positions when the intercepting device dwells in its operative position and is respectively engaged by the first and second surfaces, displacing means (which may comprise an electromagnet) which is actuatable to move the intercepting device to its inoperative position, and preferably electric control means which is operative to selectively (i.e., at the will of the user) effect a movement of the intercepting device to its operative position while the aforementioned tooth of the intercepting device is respectively approached by the first and second surfaces. Thus, if the control means causes the intercepting device to assume its operative position while the tooth of the intercepting device is being approached by the oncoming first surface, the shutter is arrested in the first angular position in which the blade means overlaps the aperture to prevent exposure of a film frame to scene light while the shutter is at a standstill. However, if the intercepting device is caused to assume its operative position while its tooth is being approached by the second surface, the shutter is brought to a halt in the second angular position in which the blade means does not overlie the foremost unexposed film frame so that the latter is exposed to scene light for as long as the shutter remains idle. The period of idleness of the shutter in its second position can be terminated by the user in response to closing of a normally open auxiliary switch which can effect a movement of the intercepting device to its inoperative position. The motor of the drive means is preferably started in automatic response to movement of the intercepting device to its inoperative position and the motor is arrested when the intercepting device assumes its operative position, preferably under the action of a spring or analogous biasing means.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a diagrammatic view of a portion of a motion picture camera with adjustable shutter means which embodies the invention.

DESCRIPTION OF THE PREFERRED EMBODIMENTS

The drawing illustrates a portion of a motion picture camera which comprises a rotary shutter 1 having a drumshaped portion or hub 2 provided with an arcuate blade 3 extending along an arc at least slightly in excess of 180°. The hub 2 is mounted on a shaft 4 which can be driven by the output shaft 6 of an electric motor 7 through the intermediary of a step-down transmission 5 indicated by broken lines. The motor 7 is installed in the housing or body (not shown) of the motion picture camera. It is assumed that the shutter 1 is rotatable in a clockwise direction as indicated by the arrow A. The hub 2 is provided at one of its axial ends with two projections or stops 8, 9 spaced from each other at an angle of approximately 150°, as considered in the direction of the arrow A. The front surfaces of the projections 8, 9 are respectively indicated at 8a and 9a.

The shutter 1 can be arrested in one of two predetermined angular positons when the surface 8a or 9a of the projection 9 or 9 is engaged by a bent-over portion or tooth 12a provided on one arm 12 of a two-armed arresting or intercepting lever 10 which is pivotable in the camera body, as at 11. The intercepting lever 10 is located in a plane which is normal to the axis of the shaft 4 and its tooth 12a is located in the plane of orbital movement of the projections 8, 9. The arm 12 is further provided with a metallic plate 13 which constitutes the armature of an electromagnet 14. The latter constitutes a displacing means for the lever 10. A helical spring 16 which is attached to a post 16a of the camera body and to a post 16b on the other arm 15 of the lever 10 tends to maintain the tooth 12a in the path of movement of the surfaces 8a, 9a on the projections 8 and 9. When the electromagnet 14 is energized, the lever 10 is caused to pivot in a counterclockwise direction, as viewed in the drawing, to stress the spring 16 and to retract the tooth 12a from the path of the projections 8, 9. When the spring 15 is free to contract, i.e., when the electromagnet 14 is deenergized, the arm 12 of the lever 10 abuts against a fixed stop pin 17 in the camera body. Such operative position of the lever 10 is shown in the drawing. When the electromagnet 14 is energized to attract the arm 12, an actuating element or trip 18 on the arm 15 of the lever 10 closes a normally open starter switch 19 which completes the circuit of the motor 7. The starter switch 19 is in series with a battery 21 or an analogous source of electrical energy. It will be seen that the energization of electromagnet 14 results in immediate starting of the motor 7 whose shaft 6 then transmits torque to the shutter 1 by way of the transmission 5. The electromagnet 14 insures that the motor 7 can rotate the shutter 1 only when the intercepting lever 10 dwells in its retracted or inoperative positon in which the tooth 12a cannot interfere with rotation of the shutter.

The electromagnet 14 is connected with one pole of the energy source 21 by a first conductor 20. A second conductor 22 connects the electromagnet 14 with the other pole of the energy source 21 and contains a normally open auxiliary switch 23. A normally open master switch 25 is connected between the conductor 22 and a conductor 24 which connects the other pole of the energy source 21 with one contact of the starter switch 19.

When the camera is not in use, the blade 3 of the shutter 1 assumes the angular position which is shown in the drawing; the tooth 12a on the arm 12 of the intercepting lever 10 then engages the surface 8a of the projection 8 on the hub 2 and the blade 3 overlies a light-admitting aperture 26 (indicated by broken lines) which is provided in a wall or partition 126 and is located in front of the foremost unexposed film frame, not shown. Thus such film frame cannot be exposed to scene light.

If the user of the camera wishes to make a series of successive exposures with predetermined exposure times (e.g., 1/30 second), the master switch 25 is closed to complete the circuit of the electromagnet 14 by way of the conductor 20, energy source 21, a portion of the conductor 24, master switch 25 and conductor 22. The electromagnet 14 attracts the armature 13 to pivot the arm 12 of the intercepting lever 10 away from the stop pin 17 and to simultaneously withdraw the tooth 12a from the path of the projection 8 on the hub 2. The trip 18 on the arm 15 of the lever 10 closes the starter switch 19 to thus complete the circuit of the motor 7 whereby the output shaft 6 transmits torque to the shaft 4 by way of the transmission 5 and the shutter 1 is caused to rotate in a clockwise direction (arrow A). The shaft 4 carries the customary cam means (not shown) which imparts recurrent movements to a conventional claw pull-down or an analogous film feeding device so that the latter transports the motion picture film stepwise, always by the length of a frame. The transport of the film by the length of a frame takes place while the blade 3 overlies the aperture 26 and the film is at a standstill (i.e., a fresh film frame registers with the aperture 26) when the blade 3 allows scene light to reach the aperture 26. A film transporting or feeding mechanism which could be utilized to transport successive frames of motion picture film into register with the light-admitting aperture 26 of the wall 126 is disclosed for example in U.S. Pat. No. 2,153,142.

If the user wishes to terminate the making of exposures with predetermined short exposure times, the pressure upon the movable contact of the master switch 25 is terminated so that the switch 25 opens and causes a deenergization of the electromagnet 14 whereby the spring 16 pivots the intercepting lever 10 in a clockwise direction to return the tooth 12a into the path of the surface 8a on the projection 8. At the same time, the trip 18 allows the master switch 19 to open so that the motor 7 is arrested and ceases to transmit torque to the shaft 4. The arrangement is such that the shutter 1 is automatically arrested in a predetermined angular position (shown in the drawing) in which the blade 3 overlies the light-admitting aperture 26 to prevent exposure of the film frame behind the aperture 26 to scene light. This is achieved by delaying the deenergization of electromagnet 14 in response to opening of the master switch 25 in the following way:

The front end portion of the hub 2 carries a rotary annular contact plate 27 of current-conducting material which is provided with two angularly offset arcuate insulating portions 28 and 29 located at different distances from the shaft 4 and having their centers of curvature on the axis of the shutter 1. The insulating portions 28, 29 (hereinafter called insulators for short) serve to insure that the shutter 1 is invariably arrested in one of two predetermined angular positions in one of which (as shown in the drawing) the shutter comes to a standstill when the blade 3 overlies the light-admitting aperture 26 and in the other of which the blade 3 is out of register with the aperture 26 so that the latter admits scene light to the adjacent film frame while the shutter 1 is at a standstill. The shutter assumes such other angular position when the tooth 12a on the arm 12 of the intercepting lever 10 engages the surface 9a of the projection 9 on the hub 2.

The electric circuitry of the motion picture camera further comprises two fixed elastic contacts 30, 31 which bear against the illustrated side of the contact plate 27 and are respectively spaced from the axis of the shaft 4 the same distance as the insulators 28, 29. The fixed contacts 30, 31 are respectively connected with conductors 32, 33 which are connected with two fixed contacts 34a, 34b of a two-way switch 34 having a movable contact 34c connected to the other pole of the energy source 21 by a further conductor 35. The switch 34 can be manipulated by hand and its movable contact 34c normally assumes the solid-line position in which the conductor 32 is connected with the other pole of the energy source 21 by way of the conductor 35.

A third fixed elastic contact 36 bears against the contact plate 27 radially inwardly of the insulator 28 and is connected with the conductor 22 by a conductor 37. The control elements 27, 28, 29, 30, 31 34 together constitute a control means which can effect a stoppage of the shutter 1 in a selected one of the two angular positions, depending on the selected nature of exposures (either with predetermined short exposure times or with longer exposure times whose duration can be selected at will). The control means 27–31, 34 controls the deenergization of electromagnet 14 in such a way that the tooth 12a is caused by spring 16 to enter the path of the projections 8, 9 at a time when it is being approached by the surface 8a of the projection 8 (short exposure times) or by the surface 9a of the projection 9 (long exposure times). If the user of the camera wishes to terminate the making of a series of short exposures, i.e., when the movable contact 34c of the two-way switch 34 dwells in the solid-line position, the master switch 25 is allowed to open but this does not result in immediate deenergization of the electromagnet 14 save in the event when the master switch 25 is allowed or caused to open at the exact moment when the fixed elastic contact 30 bears against the leading or left-hand portion of the insulator 28. This is due to the fact that the switch including the contact plate 27 and the fixed elastic contacts 30, 36 is connected in parallel with the master switch 25. Thus, if the master switch 25 opens at a time when the fixed elastic contact 30 bears against a conductive portion of the contact plate 27, the circuit of the electromagnet 14 remains completed by way of the conductor 20, energy source 21, conductor 35, contacts 34a, 34c of the two-way switch 34, conductor 32, fixed elastic contact 30, contact plate 27, fixed elastic contact 36, and conductors 37, 22. The switch including the parts 27, 30 36 opens automatically when, in response to continued clockwise rotation of the shutter 1 (in the open position of the master switch 25), the leading or left-hand end portion of the insulator 28 reaches the fixed elastic contact 30 so that the current flow between the contacts 30 and 36 is interrupted. The deenergized electromagnet 14 allows the spring 16 to contract and to move the tooth 12a into the path of the surface 8a on the approaching projection 8. The trip 18 allows the starter switch 19 to open and to arrest the motor 7. The inertia of moving parts causes the shutter 1 to turn after the starter switch 19 opens so that the surface 3a of the projection 8 advances to the angular position shown in the drawing in which it is positively engaged by the tooth 12a. The blade 3 overlies the light-admitting aperture 26.

If the user of the camera wishes to make a single exposure with a short exposure time (while the movable contact 34c engages the fixed contact 34a of the two-way switch 34), the auxiliary switch 23 is closed to complete the circuit of the electromagnet 14 by way of the conductor 20, energy source 21, conductor 35, auxiliary switch 23 and conductor 22. The auxiliary switch 23 is of the well known type which allows for a short-lasting flow of current between its contacts. However, the period of energization of the electromagnet 14 is sufficient to effect a retraction of the tooth 12a from the path of the projection 8 and to simultaneously effect a closing of the starter switch 19 so that the motor 7 is started and rotates the shutter 1. The auxiliary switch 23 interrupts the flow of current between the conductors 35, 22 with a delay which is necessary to insure that the shutter 1 moves the insulator 28 on the contact plate 27 beyond the fixed elastic contact 30. Consequently, the switch 27, 30 36 continues to complete the circuit of the electromagnet 14 in the aforedescribed manner even though the auxiliary switch 23 interrupts the flow of current between the conductors 35 and 22. The circuit of the electromagnet 14 is completed by way of the conductor 20, energy source 21, conductor 35, switch 34, conductor 32, fixed elastic contact 30, plate 27, fixed elastic contact 36, and conductors 37, 22. Shortly before the shaft 4 completes a full revolution, the left-hand (leading) end of the insulator 28 reaches the fixed elastic contact 30 to open the circuit of the electromagnet 14 so that the spring 16 is free to contract and to return the tooth 12a into the path of the surface 8a on the oncoming projection 8. At the same time, the trip 18 allows the starter switch 19 to open and to arrest the motor 7. The inertia of moving parts causes the projection 8 to advance its surface 8a into engagement with the tooth 12a whereby the shutter 1 is again arrested in that angular position in which the blade 3 overlies the light-admitting aperture 26. It will be seen that, on closing of the auxiliary switch 23, the shutter 1 is caused to complete a full revolution which suffices to advance the film by the length of a frame (while the blade 3 continues to overlie the aperture 26) and to effect the exposure of the film frame behind the aperture 26 to scene light with a short exposure time (while the blade 3 is out of register with the aperture 26).

If the user wishes to make exposures with long exposure times, the movable contact 34c of the two-way switch 34 is moved to the broken-line position so as to engage the fixed contact 34b. The circuit of the electromagnet 14 is then completed by way of the conductor 20, energy source 21, conductor 35, contacts 34c, 34b of the two-way switch 34, conductor 33, fixed elastic contact 31, contact plate 27, fixed elastic contact 36, and conductors 37, 22. The electromagnet 14 withdraws the tooth 12a from the path of the surface 8a on the projection 8 and causes the trip 18 to effect a closing of the starter switch 19 so that the motor 7 is started and rotates the shutter 1 beyond the angular position shown in the drawing. When the shutter 1 completes about one-half of a revolution, the leading end of the insulator 29 reaches the fixed elastic contact 31 and opens the circuit of the electromagnet 14 so that the tooth 12a moves into the path of the surface 9a on the approaching projection 9 and the trip 18 allows the starter switch 19 to open. The inertia of moving parts causes the shutter 1 to turn until the surface 9a of the projection 9 moves into engagement with the tooth 12a to arrest the shutter in that angular position in which the aperture 26 (and the freshly advanced unexposed film frame behind such aperture) is exposed to scene light. The shutter 1 remains in the just described angular position (in which the film frame behind the aperture 26 is exposed to scene light) until the user actuates the auxiliary switch 23 to energize the electromagnet 14 by way of the conductor 20, energy source 21, conductor 35, auxiliary switch 23 and conductor 22. The energized electromagnet 14 withdraws the tooth 12a from the path of the surface 9a on the projection 9 and causes the trip 18 to close the starter switch 19 so that the motor 7 rotates the shutter 1. The completion of the circuit of electromagnet 14 by the auxiliary switch 23 lasts for an interval which suffices to move the insulator 29 beyond the fixed elastic contact 31 so that the circuit of the electromagnet 14 remains completed in spite of an interruption of the flow of current between the conductors 35 and 22 because such circuit is completed by way of the conductor 20, energy source 21, conductor 35, contacts 34c, 34b of the two-way switch 34, conductor 33, fixed elastic contact 31, contact plate 27, fixed elastic contact 36 and conductors 37, 22. Shortly before the shutter 1 completes a full revolution, the leading end of the insulator 29 engages the fixed elastic contact 31 to open the circuit of the electromagnet 14 so that the tooth 12a returns into the path of the surface 9a on the oncoming projection 9 and the trip 18 allows the starter switch 19 to open. The shutter 1 comes to a halt when the surface 9a of the projection 9 engages the tooth 12a and while the shutter is open, i.e. while the blade 3 is out of register with the aperture 26 so that the latter can admit scene light to a fresh film frame (which has been moved into register with the aperture 26 during rotation of the shutter 1 on closing of the auxiliary switch 23). The exposure of freshly advanced foremost unexposed film frame to scene light is terminated when the user decides to close the auxiliary switch 23. The making of exposures with long exposure times is continued automatically and each such exposure is completed in response to closing of the auxiliary switch 23 which causes the shutter 1 to complete a full revolution and to thereby automatically start the long exposure of the next film frame.

In order to terminate the making of exposures with long exposure times, the user must return the movable contact 34c of the two-way switch 34 to the solid-line position. The energy source 21 is then connected with the fixed elastic contact 30 by way of the conductor 35, two-way switch 34 and conductor 32. Since the fixed elastic contact 30 engages the contact plate 27 (because the fixed elastic contact 31 engages the insulator 29), the electromagnet 14 is energized and starts the motor 7 while simultaneously retracting the tooth 12a from the path of the surface 9a on the projection 9. When the leading end of the insulator 28 reaches the fixed elastic contact 30, the electromagnet 14 is deenergized and causes the tooth 12a to enter the path of the surface 8a on the oncoming projection 8 while the trip 18 allows the starter switch 19 to open and to arrest the motor 7. The shutter 1 comes to a halt in the angular position which is shown in the drawing.

An important advantage of the improved motion picture camera is that the intercepting means for the shutter 1 comprises a single member (the lever 10)

which need not be shifted in the axial direction of the shutter but remains in a single plane and invariably performs movements of predetermined magnitude, irrespective of whether it is to intercept the shutter in the illustrated first angular position or in the second angular position in which the blade 3 is out of register with the aperture 26.

Another advantage of the improved camera is that the timing of movements of the lever 10 to its operative position is not determined by discrete timers whose operation is not synchronized with the operation of the shutter and which must be constructed with utmost precision if they are to effect the movements of the lever 10 in good time for entry of the tooth 12a into the path of orbital of the surface 8a or 9a, but rather by control means whose operation is always initiated in a selected angular position of the shutter 1 (namely, when the leading end of the insulator 28 reaches the elastic fixed contact 30 or when the leading end of the insulator 29 reaches the elastic fixed contact 31, depending on the setting of the multi-way switch 34). This insures that the movements of the lever 10 to and from its operative position are not affected by wear or other factors which normally influence the operation of conventional timers.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended.

1. In a cinematographic apparatus, a combination comprising means defining a light-admitting aperture; a shutter having blade means and being movable between and beyond first and second positions in which said blade means respectively overlies and is out of register with said aperture; offset first and second surfaces arranged to move along a predetermined path when the shutter is in motion; means for driving said shutter; an intercepting device movable in a single predetermined plane between two predetermined operative and inoperative positions in which a portion thereof respectively extends into and is retracted from the path of movement of said surfaces whereby said shutter is respectively arrested in said first and second position when said intercepting device dwells in said operative position and said portion thereof is respectively engaged by said first and second surfaces; displacing means actuable to move said intercepting device to said inoperative position; and control means operative to selectively effect a movement of said intercepting device to said operative position while said portion thereof is respectively approached by said first and second surfaces.

2. A combination as defined in claim 1, wherein said shutter comprises a rotary shaft having first and second projections equidistant from the axis of said shaft and located in the plane of said portion of said intercepting device said first and second surfaces being respectively provided on said first and second projections.

3. A combination as defined in claim 1, further comprising means for biasing said intercepting device to said operative position, said displacing means compris-ing electromagnet means which is energizable to thereby move said intercepting device to said inoperative position against the opposition of said biasing means, said control means comprising control elements for selectively opening the circuit of said electromagnet means in said first and second positions of said shutter.

4. A combination as defined in claim 3, further comprising a plurality of electric switches connected in the circuit of said electromagnet means in parallel with each other and being actuable to effect an energization of said electromagnet means with attendant movement of said intercepting device to said inoperative position.

5. A combination as defined in claim 4, wherein one of said switches is a normally open master switch which is arranged to energize said electromagnet means for as long as it is maintained in the closed position.

6. A combination as defined in claim 3, wherein said control elements constitute a plurality of electric switches.

7. A combination as defined in claim 6, wherein one of said control elements is a rotary contact which is rotated by said drive means in synchronism with movements of said shutter.

8. A combination as defined in claim 1, further comprising starter means for starting said drive means in response to movement of said intercepting device to said inoperative position.

9. A combination as defined in claim 8, wherein said shutter is a rotary shutter and said drive means comprises an electric motor having an output shaft and means for transmitting torque from said output shaft to said shutter, said starter means comprising a normally open switch in series with said motor and said interception device comprising actuating means for closing said switch in said inoperative position thereof.

10. A combination as defined in claim 5, wherein said shutter is a rotary shutter and another of said switches is a normally open auxiliary switch which, in response to the closing thereof, is arranged to energize said electromagnet means for an interval of time which suffices to enable said drive means to rotate said shutter through a fraction of a single revolution.

11. A combination as defined in claim 10, wherein said control elements include a multi-way switch having a contact movable to a predetermined position in which the electromagnet means is energized when said shutter dwells in said first position until said shutter reaches said second position.

12. In a cinematographic apparatus, a combination comprising means defining a light-admitting aperture; a shutter having blade means and being movable between and beyond first and second positions in which said blade means respectively overlies and is out of register with said aperture; offset first and second surfaces arranged to move along a predetermined path when said shutter is in motion; means for driving said shutter; an intercepting device movable in a predetermined plane between operative and inoperative positions in which a portion thereof respectively extends into and is retracted from the path of movement of said surfaces whereby said shutter is respectively arrested in said first and second positions when said intercepting device dwells in said operative position and said portion thereof is respectively engaged by said first and second surfaces; means for biasing said intercepting device to said operative position; displacing means actuable to move said intercepting device to said inoperative position, said displacing means comprising electromagnet means which is energizable to thereby move said intercepting device to said inoperative position against the opposition of said biasing means; and control means operative to selectively affect a movement of said intercepting device to said operative position while said portion thereof is respectively approached by said first and second surfaces, said control means comprising control elements constituting a plurality of electric switches for selectively opening the circuit of said electromagnet means in said first and second positions of said shutter, one of said control elements being a rotary contact which is rotated by said drive means in synchronism with movements of said shutter and said rotary contact comprising first and second insulators, said control elements further including first and second fixed contacts normally engaging said rotary contact and respectively engaging said first and second insulators in said first and second positions of said shutter.

13. A combination as defined in claim 12, wherein said shutter is a rotary shutter and said rotary contact is connected with and is rotated by said shutter and said fixed contacts are elastic and yieldably bear against said rotary contact.

14. A combination as defined in claim 13, wherein said insulators are angularly and radially offset relative to each other with reference to the axis of said shutter.

15. A combination as defined in claim 12, wherein said control elements further include multi-way switch means movable between first and second positions to thereby respectively connect said first and second fixed contacts in the circuit of said electromagnet means.

16. A combination as defined in claim 15, further comprising a source of electrical energy in series with said rotary contact and with said electromagnet means, said first and second fixed contacts being respectively in series with said source in said first and second positions of said multi-way switch means.

* * * * *